United States Patent [19]

Houston et al.

[11] 4,053,706

[45] Oct. 11, 1977

[54] SUSPENSION BRACKET AND APPARATUS

[75] Inventors: Herbert J. Houston, Oakville; Kenneth D. Bolt, Burlington, both of Canada

[73] Assignee: Slater Steel Industries Limited, Hamilton, Canada

[21] Appl. No.: 697,476

[22] Filed: June 18, 1976

[51] Int. Cl.$^2$ .................. H01B 17/10; H02G 7/00
[52] U.S. Cl. .................. 174/149 R; 174/150; 248/63
[58] Field of Search .................. 174/40 R, 43, 141 R, 174/144, 148, 149 R, 150; 248/58, 63, 64; 254/134.3 R, 134.3 PA

[56] References Cited

U.S. PATENT DOCUMENTS

| 3,076,863 | 2/1963 | Lantz et al. | 174/149 R X |
| 3,240,870 | 3/1966 | Harmon | 174/149 R |
| 3,250,852 | 5/1966 | Hollander | 174/149 R X |

FOREIGN PATENT DOCUMENTS

| 68,266 | 8/1969 | Germany | 174/149 R |
| 259,218 | 5/1970 | U.S.S.R. | 174/149 R |

Primary Examiner—Laramie E. Askin
Attorney, Agent, or Firm—Fleit & Jacobson

[57] ABSTRACT

A suspension bracket and apparatus for a bundle conductor has a yoke plate suspended at opposite sides thereof by respective insulator strings. To reduce high voltage gradients across the lowermost insulators of the strings, one or more of the sub-conductors is clamped to the upper side of the yoke plate between the strings. To facilitate "clipping in" of this sub-conductor by providing a temporary suspension connection between one of the strings and the yoke plate in order to allow that string to be uncoupled and thereby to allow the sub-conductor to be raised past the uncoupled string, the yoke plate is provided with a cylindrical opening extending transversely of the axis of that string by which the temporary connector can be connected to the yoke plate.

11 Claims, 9 Drawing Figures

SUSPENSION BRACKET AND APPARATUS

BACKGROUND OF THE INVENTION

1. Field of the Invention

The present invention relates to suspension apparatuses and brackets for suspending electrical sub-conductors in bundles.

2. Description of the Prior Art

In high voltage transmission lines, it is common practice to suspend sub-conductors or cables in a bundle from a tower by means of a suspension assembly comprising a suspension bracket or yoke suspended at the lower ends of insulator strings, which are connected at their upper ends to a cross-arm of the tower.

It has been appreciated for some time that the cable suspension should desirably be designed so as to avoid the existence of undesirably high voltage gradients across the individual insulators of the insulator strings by which the suspension bracket is suspended. Devices such as grading rings and shields have been employed in the past in order to make such voltage gradients more uniform and thereby to relieve stress across the insulators situated nearest the suspension bracket, which would otherwise bear disporportionately high fractions of the total line to ground voltage.

Also, it has been proposed to design the suspension brackets to counteract such high voltage gradients by supporting the cables near the lowermost insulators of the strings.

For example, in Canadian Pat. No. 653,027, issued Nov. 27, 1972, inventor Robert G. Baird, there is disclosed a suspension bracket for supporting high tension cables, the bracket being constructed so as to support at least one of the cables generally outwardly and approximate the lowermost few of the insulators of insulator strings suspending the bracket.

Also in U.S. Pat. No. 3,076,863, issued Feb. 5, 1963 to A. D. Lantz et al, there is disclosed an arrangement of conductor cables including a suspension bracket or plate having two arms extending equally and oppositely from the body of the suspension plate in the transverse direction and equally in the direction of the suspension insulators, so that the two top cables are disposed closely adjacent the adjacent one of the suspension insulators.

In addition, in order to keep to a minimum the required height of the towers required for suspending the cables, it is desirable to have the bundle of cables positioned as high as possible with respect to the suspension bracket. This can advantageously be done by clamping one or more of the cables to the top of the suspension bracket. The aforementioned U.S. Pat. No. 3,076,863 discloses an arrangement in which three cables are clamped to a suspension plate in a triangular array with one of the cables, at the apex of the triangular array, positioned near the top of the suspension bracket and between two strings of insulators disposed in a V-array.

However, this previously proposed arrangement has hitherto presented a problem in that no practical and suitable means has been developed for "clipping in" the uppermost cable during the cable bundle stringing operation.

REFERENCE TO CO-PENDING APPLICATIONS

In co-pending U.S. patent application Ser. No. 690,918, filed May 28, 1976, by William W. Chadwick Jr., entitled CONDUCTOR TRANSFER DEVICE, the disclosure of which is incorporated herein by reference, there is disclosed a device which enables one of the insulator strings suspending a cable suspension bracket to be temporarily uncoupled, while the suspension of the bracket is maintained by the device, in order to allow a cable to be raised through the uncoupled insulator string and, after recoupling of the insulator string, to be clamped to the suspension bracket between the insulator strings which are connected to opposite sides of the bracket.

In a further co-pending U.S. patent application Ser. No. 697,482 filed herewith, (now U.S. Pat. No. 4,022,431) by Herbert J. Houston et al., entitled METHODS OF STRINGING BUNDLE CONDUCTORS, the disclosure of which is also incorporated herein by reference, there is disclosed a conductor stringing method employing the apparatus described in the aforementioned patent application by William W. Chadwick Jr.

SUMMARY OF THE INVENTION

In accordance with the present invention, a cable bundle suspension bracket, for example in the form of a yoke plate, comprises a body portion having a plurality of cable clamps pivotally connected thereto, and first and second means for connecting respective insulator strings to the body portion. At least one of the cable clamps is located at the upper side of the body portion, between the first and second insulator string connection means, for suspending one of the cables between the insulator strings.

In order to permit the suspension bracket to be easily and securely connected to a temporary connector, e.g. such as that described in the aforementioned co-pending U.S. application Ser. No. 690,918 by William W. Chadwick Jr., and thereby to enable a cable to be "clipped in" to the aforementioned clamp at the upper side of the body portion, the latter is provided with means for attachment of the temporary connector to the bracket.

In a preferred embodiment of the invention, described hereinafter, the attachment means takes the form of a cylindrical opening which extends through the bracket and which is, when the bracket is in use, located on an imaginary extension of the insulator strings which is to be uncoupled as mentioned hereinbefore and as described in greater detail hereinafter.

BRIEF DESCRIPTION OF THE DRAWINGS

The invention will be more readily understood from the following description of preferred embodiments thereof given, by way of example only, with reference to the accompanying drawings, in which:

FIG. 1A shows a view taken in section along the line 1A—1A of FIG. 1;

DESCRIPTION OF THE PREFERRED EMBODIMENTS

Figure 1:
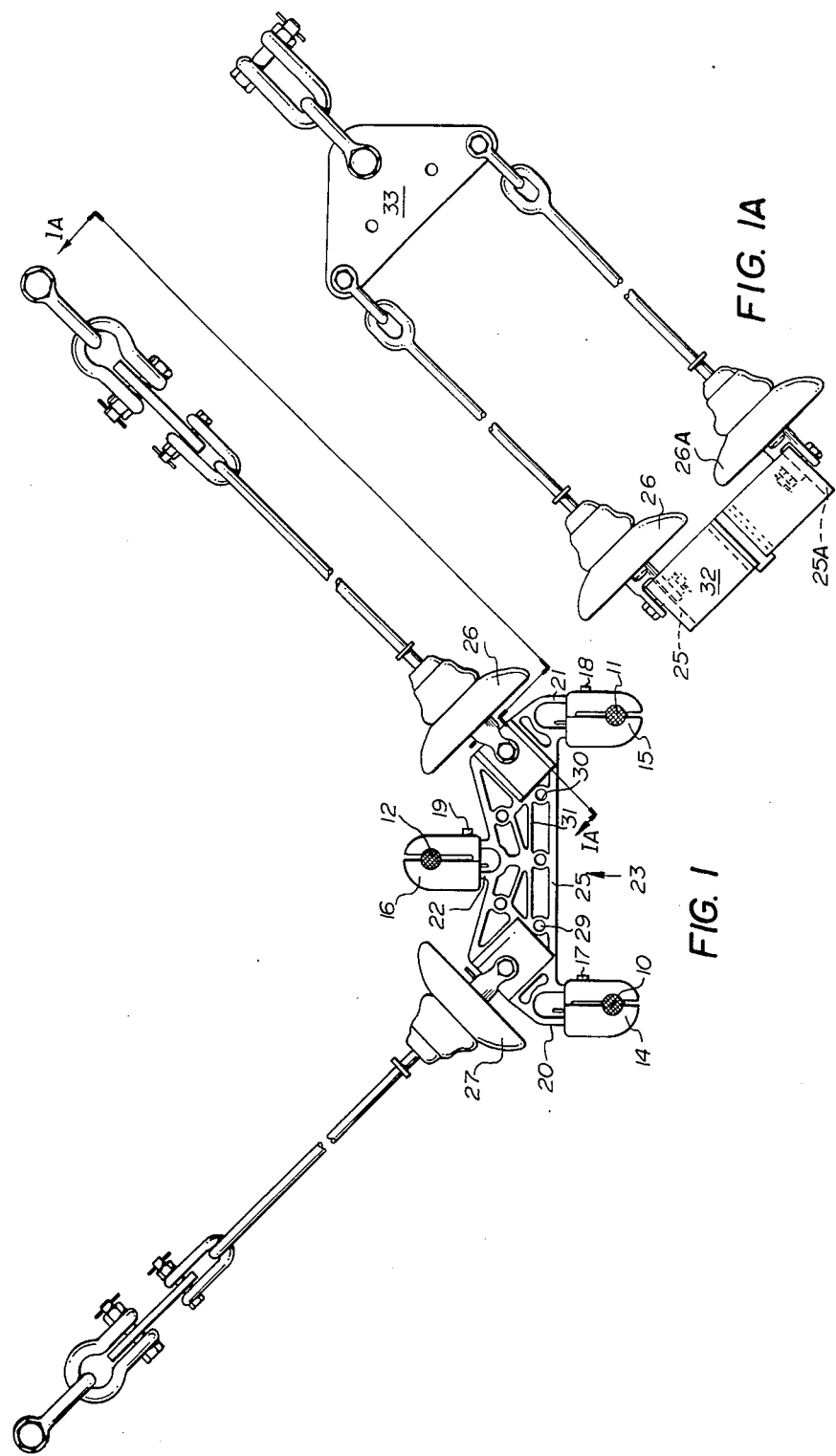
FIG. 1 shows a front elevational view of a cable bundle suspension apparatus with a bundle conductor clamped thereto.

Referring firstly to FIG. 1 of the accompanying drawings, this Figure illustrates a suspension apparatus for suspending a bundle of three cables or sub-conductors 10, 11 and 12.

Three cable clamps 14, 15 and 16 are illustrated in clamped engagement with the cables 10, 11 and 12, respectively. The cable clamps 14, 15 and 16 are of a construction which is well known in the art and which therefore will not be described in greater detail herein.

The cable clamps 14, 15 and 16 are pivotally connected by respective pivot pins 17, 18 and 19 to bifurcated arms 20, 21 and 22, respectively, of a suspension bracket indicated generally by reference numeral 23.

As can be seen from FIG. 1A, the suspension bracket 23 has two parallel, generally planar transversely extending yoke plates 25 and 25A.

At the right-hand side of the suspension bracket 23, as viewed in FIG. 1, the yoke plates 25 and 25A are connected to insulators 26 and 26A, respectively, and the opposite sides of the yoke plates 25 and 25A are connected to two other respective insulators, of which only one is shown in the drawings and is indicated by reference numeral 27. As can be seen in FIGS. 1 and 1A, the insulators lie generally in the plane at the yoke plates.

The yoke plates 25 and 25A, which are manufactured by any suitable process such as casting or forging, are of similar construction and accordingly only the yoke plate 25 will be described in greater detail herein.

As can be seen from FIG. 1, the yoke plate 25 is formed with two cylindrical openings 29 and 30 extending therethrough to enable connection to the yoke plate 25 of a temporary connector tool which is indicated generally by reference numeral 34 in FIG. 5 and which will be described in greater detail hereinafter.

The yoke plate 25 is also formed with a plurality of reinforcement ribs, of which one is indicated by reference numeral 31 in FIG. 1.

As can be seen from FIG. 1A, the yoke plates 25 and 25A are connected by a transverse end plate 32, which is one of a pair of such end plates extending between the yoke plates 25 and 25A at opposite sides of the suspension bracket 23.

As will be apparent to those skilled in the art, the three cable clamps 14, 15 and 16 are located on the suspension bracket 23, and the latter is dimensioned, so that the three cables 10, 11 and 12 are supported in proximity to the insulators 26, 26A and 27. This has the advantage of reducing the voltage gradient across those insulators.

Furthermore, since the cable 12 and its clamp 16 are disposed above the suspension bracket 23, the height of the suspension assembly above the ground is correspondingly reduced as compared with conventional bundle conductor suspension assemblies in which all of the cables or sub-conductors are suspended below the insulator strings.

Figure 5:
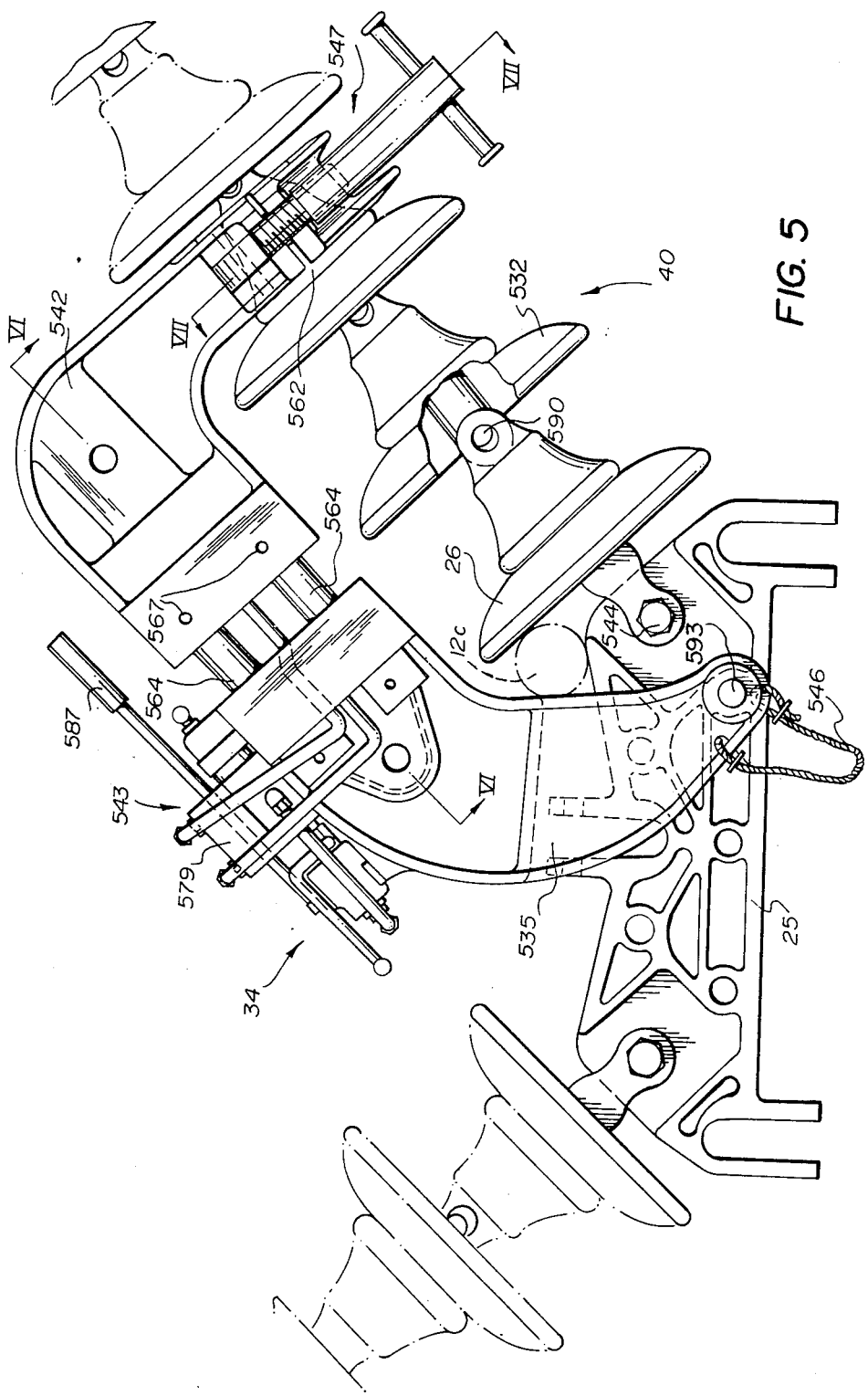
FIG. 5 shows a side view of a temporary connector tool attached to the suspension assembly during the stringing operation.
Figure 6:
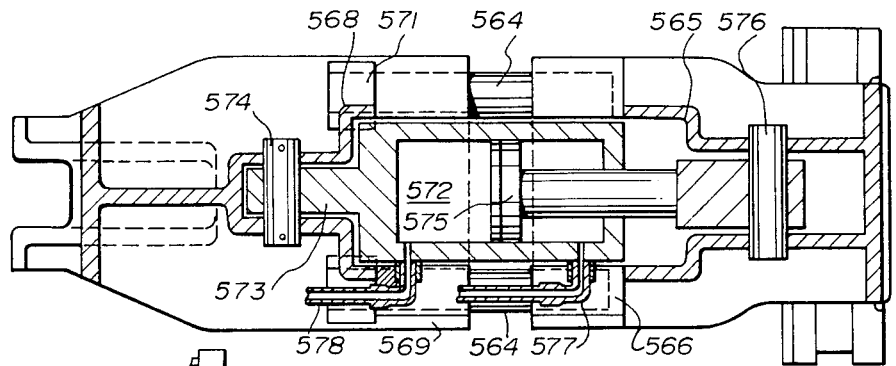
FIG. 6 shows a view taken in section along the line VI—VI of FIG. 5.
Figure 7:
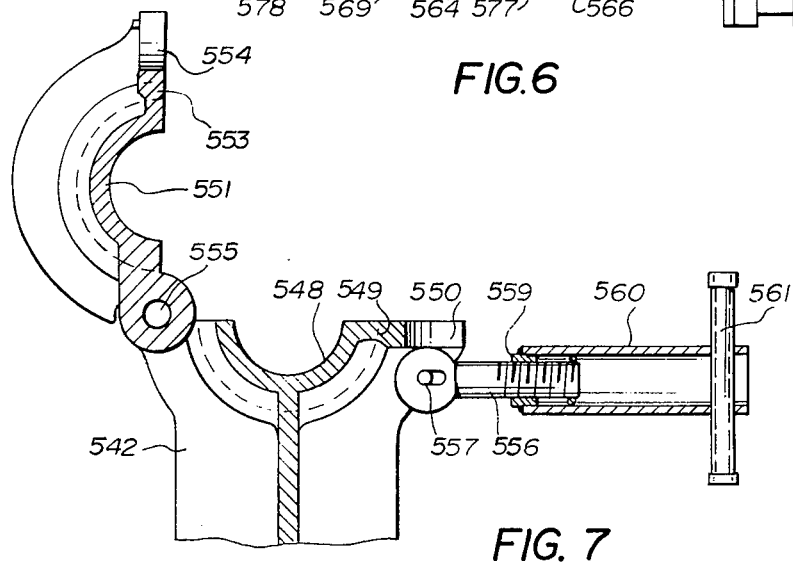
FIG. 7 shows a view taken in section along the line VII—VII of FIG. 5.
Figure 8:
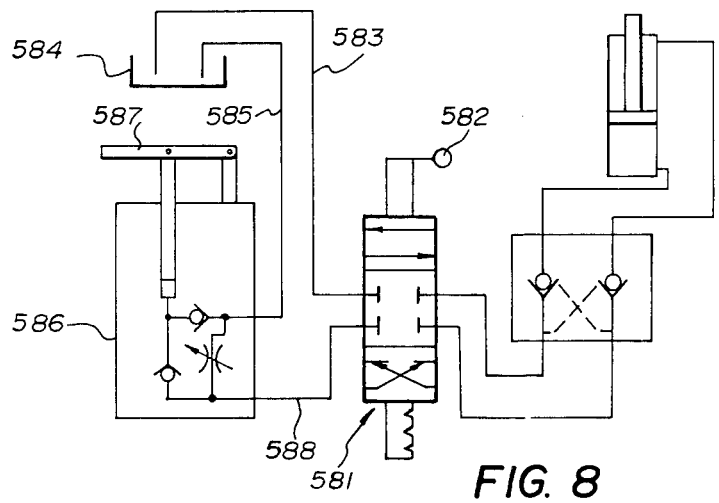
FIG. 8 shows a diagrammatic view of a hydraulic circuit provided for operating the temporary connector tool shown in FIG. 5.

The insulators 26 and 26A are the lowermost insulators of two insulator strings, of which a part of one is indicated generally by reference numeral 40 in FIG. 5.

Likewise, the insulator 27 and the corresponding insulator at the left-hand side of FIG. 1 and connected to the yoke plates 25 and 25A are the lowermost insulators of two corresponding insulator strings at the other side of the suspension bracket 23.

Thus, the suspension bracket 23 is suspended from, for example, a cross-arm of a support tower by a double V insulator string arrangement.

As can be seen from FIG. 1A, the upper ends of the insulator strings at one side of the suspension apparatus are connected by a triangular plate 33, which when the apparatus is in use in shackled to the tower cross-arm. The insulator strings at the other side of the suspension bracket 23 are similarly connected.

Figure 2:
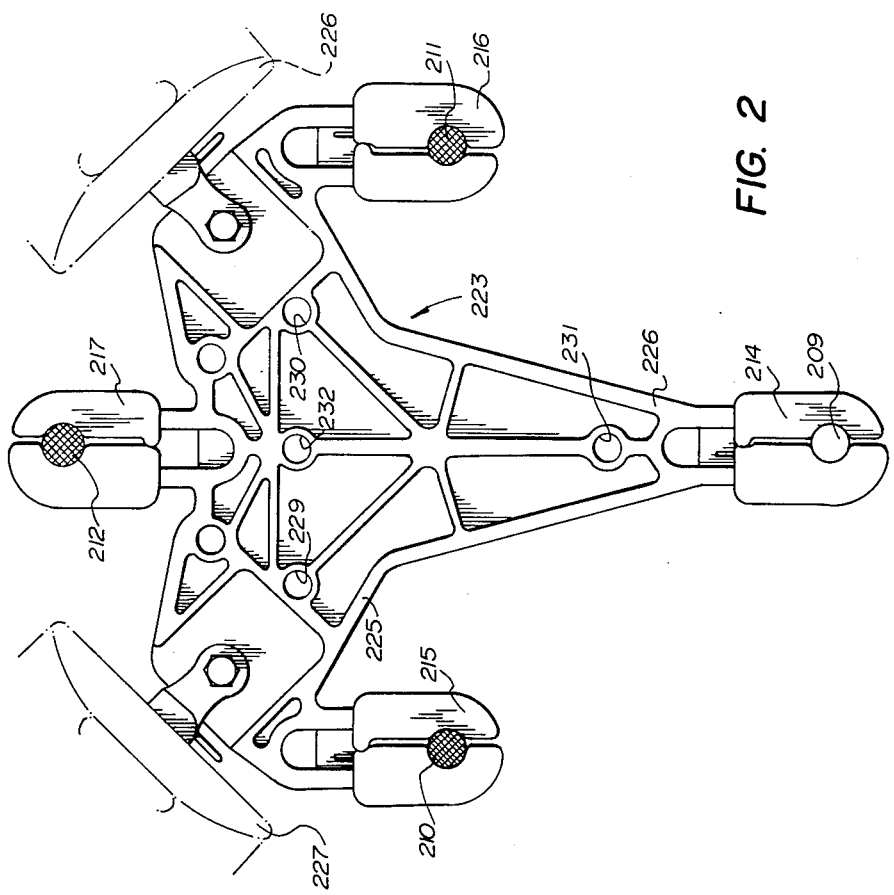
FIGS. 2 through 4 show front views of three modified embodiments of the cable suspension bracket according to the present invention.

The modified yoke plate illustrated in FIG. 2 is designed to support four cables, which are indicated by reference numerals 209 through 212 and which are connected by respective cable clamps 214 through 217 to the suspension bracket, which is indicated generally by reference numeral 223.

The suspension bracket 223 comprises a yoke plate 225 which, as can be seen, is somewhat similar to the yoke plate 25 of FIG. 1 but which has been modified by the incorporation therein of a downwardly extending clamp support arm 226 for supporting the lowermost cable clamp 214.

The yoke plate 225 is also formed with four cylindrical through openings 229, 230, 231 and 232 for connection of a temporary connector tool, as described hereinafter.

The lowermost insulators of two insulator strings which are attached to the yoke plate 25 for suspending the latter have been indicated in broken lines at 226 and 227 of FIG. 2, and it will be understood that these insulator strings are arranged in a V arrangement.

Figure 3:
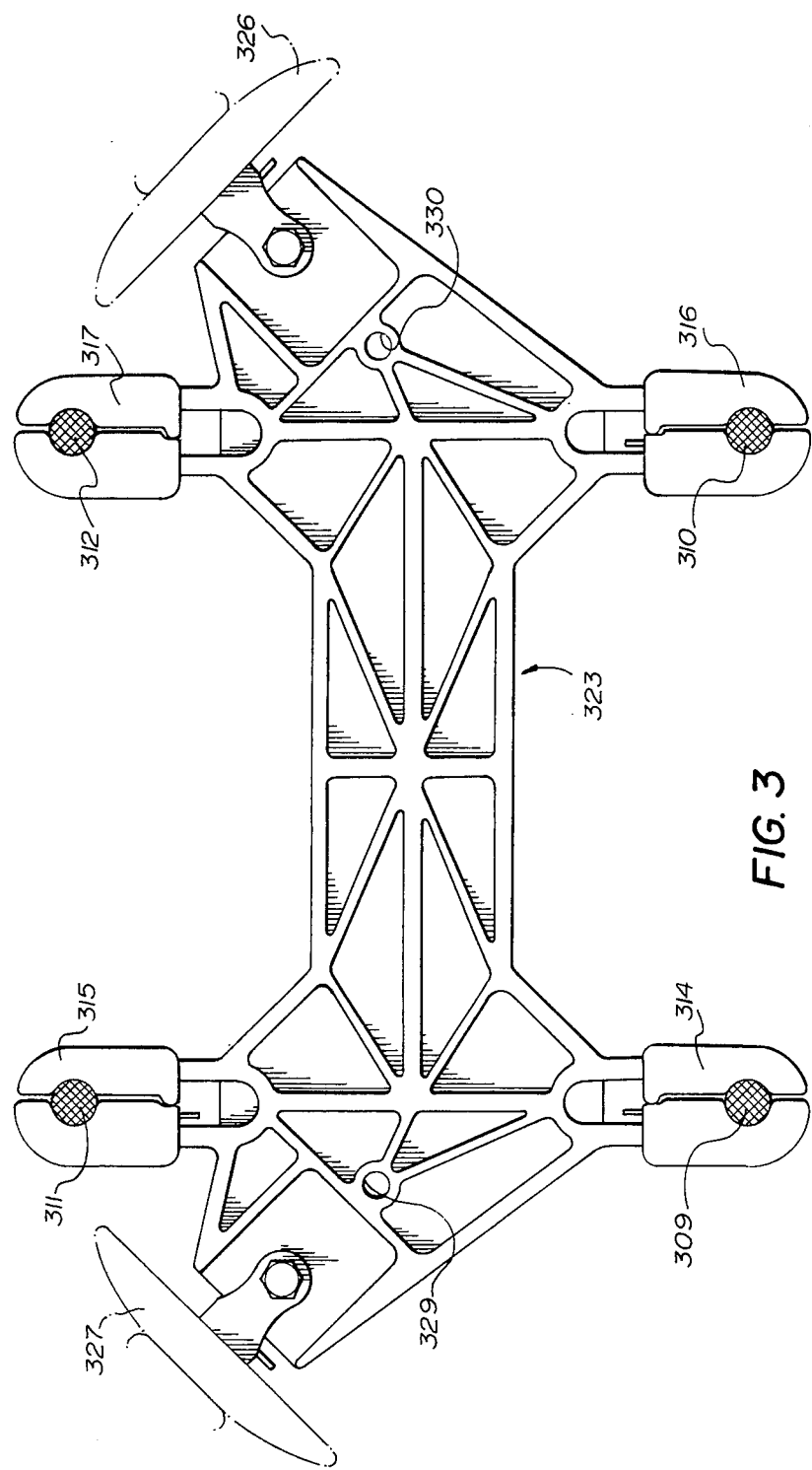

A still further embodiment of the present suspension bracket, which is shown in FIG. 3 and indicated generally by reference numeral 323, is intended to suspend a bundle of four sub-conductors or cables 309, 310, 311 and 312 from two insulator strings which are in a V array and of which the lowermost insulators are indicated by reference numerals 326 and 327.

The yoke plate 323 is formed with two cylindrical through openings 329 and 330 for connection of a temporary connector device to the yoke plate 323 as described hereinafter.

It will be seen that the conductors 309 and 311, which are secured to the yoke plate 323 by clamps 314 and 315, which are similar to the clamps 14 through 16 of FIG. 1, are located in proximity to the lowermost insulator 327 of the left-hand insulator string.

Similarly, the cables 310 and 312 are secured by clamps 316 and 317, similar to the clamps 14 through 16, in proximity to the lowermost insulator 326 of the right-hand insulator string. Also, as will be readily apparent from FIG. 3, the conductors 311 and 312 are disposed between the two above-mentioned insulator strings suspending the yoke plate 323.

Figure 4:
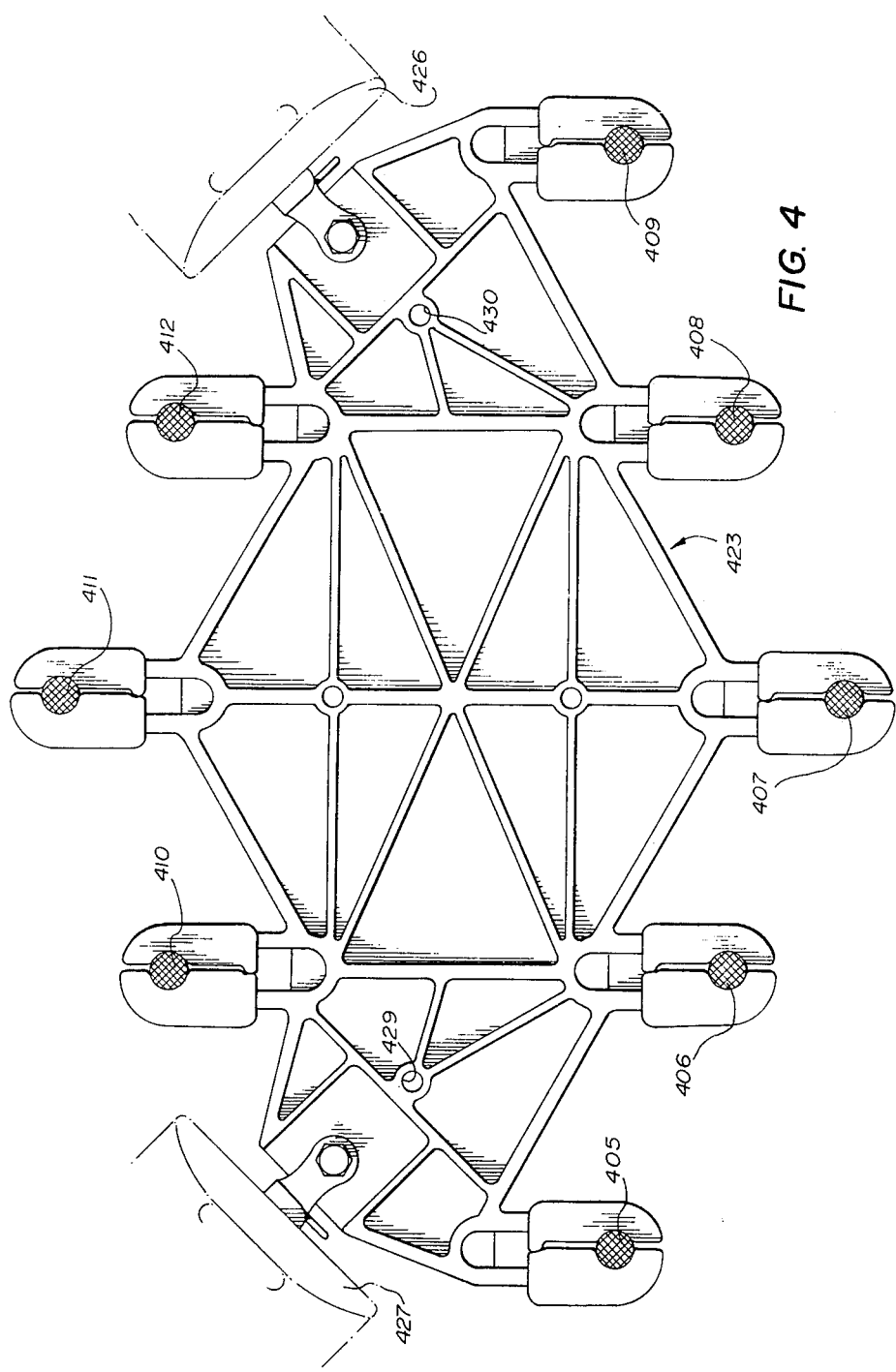

The yoke plate illustrated in FIG. 4 and indicated be reference numeral 423 is intended to support a bundle of eight sub-conductors or cables 405 through 411, each of which is secured to the yoke plate 423 by a respective clamp. Since these clamps are similar to the clamps 14 through 16 of FIG. 1, it is not considered necessary to refer to them individually.

The yoke plate 423 is also formed with two cylindrical through openings 429 and 430, and is suspended by two insulator strings in V array, of which the lowermost insulators are indicated by reference numerals 426 and 427.

The manner in which the above-described yoke plates co-operate with the above-mentioned connector tool will now be described with reference to FIGS. 5 to 8. These Figures illustrate the tool, which is indicated generally by reference numeral 34, in co-operation with the yoke plate 25 of FIG. 1. However, as will be readily apparent, this tool can co-operate similarly with the yoke plates shown in FIGS. 2, 3 and 4.

As can be seen from FIG. 5, the temporary connector tool 34, which is the subject of the above-mentioned co-pending U.S. patent application Ser No. 690,918, filed May 28, 1976, by William W. Chadwick Jr., is of generally C-shaped configuration and comprises an upper portion or frame 542, a lower portion or frame 535, and means indicated generally by reference numeral 543 for interconnecting the lower end of the upper frame 542 and the upper end of the lower frame 535 and operable to effect longitudinal movement of the frames 535 and 542 relative to each other. The lower end portion of the lower frame 535 is bifurcated to enable it to straddle the yoke plate 25 and is apertured to receive a flanged ball-lock pin 593, which may be inserted through the cylindrical through opening or aperture 30 provided in the yoke plate 25 in alignment with a socket clevis bolt 544 and with the longitudinal axis of the right-hand insulator string 40. The bolt 544 serves to connect the lowermost insulator 26 of the insulator string 40 to the suspension bracket 23, and the flange of the pin 593 is loosely connected to the lower frame 535 by a keeper cord or lanyard 546.

The upper end of the upper frame 542 is provided with clamping means, indicated generally by reference numeral 547, which comprises a first semi-circular jaw 548 formed at the end of the frame and having a lateral extension 549 with a first slot 550 in its outer end, and a second semi-circular jaw 551 shaped complementally to jaw 548, with a lateral extension 553 having a second slot 554 in one end aligned with the first slot 550 and pivotally mounted at its other end at 555 on the upper frame 542. The clamping means 547 includes a bolt 556 pivotally mounted at 557 on the frame 542 for movement into and out of the slots 550 and 554, with its free end threaded to receive a nut 559 for engagement with the lateral extension 553, and a sleeve 560 having its inner end secured to the nut 559 and provided at its outer end with a radially extending handle 561.

The jaws 548 and 551 are adapted to embrace a metal cap 562 of one of the insulators in the string 40, after which the lower frame is secured to the suspension bracket 23 by the pin 593. As can also be seen from FIG. 5, the lower portion of the upper frame 542 and the upper portion of the lower frame 535 are aligned with each other longitudinally of the temporary connection device 34, and their outer ends are offset therefrom so that the centres of the jaws 548 and 551 and the securing means or pin 593 define a longitudinal axis which coincides with that of the insulator string 40.

The means 543 interconnecting the frames 535 and 542 includes four guide pins 564 which are parallel to that longitudinal axis. The lower part of the upper frame 542 defines a hollow housing 565 with an end portion 566 having suitable apertures for receiving the upper ends of the guide pins 564 which are secured thereto by pins 567. The upper part of the lower frame 535 similarly defines a hollow housing 568 with an end portion 569 having apertures extending therethrough slidably receiving the guide pins 564. Stop rings 571 are mounted on and suitably secured to the lower ends of guide pins 564 to limit downward sliding of the lower frame 535 on the pins 564.

The interconnecting means 543, as previously noted, also effects longitudinal movement of the frames 542 and 535 relative to each other. To this end it includes an hydraulic cylinder 572 (FIG. 6) having a connecting member 573 secured to its lower end, as by welding, which is disposed within the housing 568 and is connected thereto by a pin 574. A piston 575 mounted in the cylinder 572 has its rod extending upwardly in the housing 565 and connected thereto by a pin 576. The upper end of the cylinder 572 is connected in well-known manner to an hydraulic line or conduit 577 and the lower end of the cylinder similarly is connected to a line 578. A double pilot operated check valve 579 (FIG. 5) is interposed in the lines 577 and 578, and beyond the valve 579 those lines are connected to a four-way manual three-position detent control valve 581 which is controlled by a handle 582. The interconnection of these hydraulic mechanisms is illustrated schematically in FIG. 8, which also shows a conduit 583 connecting the valve 581 to a reservoir or source of fluid 584 and an inlet conduit 585 connecting the reservoir 584 to a hand pump 586. The latter is operable by a handle 587 and is connected to the control valve 581 by an outlet conduit 588. The hand pump 586 and reservoir 584 preferably are formed as an integral unit.

The valve 579 prevents the cylinder 572 from bleeding down should there by a hydraulic failure in the pump 586 or the control valve 581. This also makes it necessary to power the cylinder 572 down, instead of allowing it to bleed down by gravity or be forced down by an external load. Such operation is important here because the insulators will not withstand very high shock or impact loads. It will be readily apparent from FIG. 8 that the control valve 581 may be operated by its handle 582 to select the power-up or power-down modes of the cylinder 572 and its piston 575 in response to operation of the pump 586 by means of its handle 587.

The above-described temporary connector device is employed when it is desired to move the cable 12 upwardly through the insulator string 40. To enable such movement of the cable 12, the lineman will interconnect a portion of the insulator string 40 and the suspension bracket 23, as shown in FIG. 5. To accomplish this, the jaws 548 and 551 are secured around the metal cap 562 of one of the insulators of the string 40 by means of the nut 559 and the bolt 556, and the lower frame 535 then is mounted upon the suspension bracket 23 and connected by the pin 593 thereto.

The frame 542 is then displaced downwardly relative to the lower frame 535 in the direction of the axis of the insulator string 40 by first adjusting the valve handle 581 to set the control valve in position for a power-up mode, and then actuating the pump handle 587. This will force fluid into the upper portion of the cylinder 572 through the line 577 to move the piston 575 downwardly.

Only a relatively small degree of relative movement of the frames is required, i.e. just enough travel to relieve tension in the insulator string 40 to facilitate removal of the socket clevis bolt 544 or an insulator connecting pin 590 between the insulator 26 and an adjacent insulator 532. This provides clearance for movement of the cable 12 upwardly to the dotted line position illustrated at 12c in FIG. 5.

Upon completion of the movement of the conductor through the insulator string 40, i.e. from one side of it to the other, the insulator string is reconnected by replacing the bolt 544 or pin 590 and the valve 581 is adjusted by moving its handle 582 to a power-down mode. Subsequent operation of the pump handle 587 will move the frames 535 and 542 away from each other. The insulator string 40 thus will resume its support of the suspension bracket, and the temporary connector device 34 is then removed. The cable 12 then may be moved from its broken line position 12c and connected in its final position of FIG. 1 to the suspension bracket 23 by the clamp 16.

To facilitate the operation of the temporary connection tool 34, the cylindrical opening 30 for receiving the flanged ball-lock pin 593 by which the temporary connector tool 34 is connected to the yoke plate is aligned with the longitudinal axis of the insulator string 40, as mentioned above. In other words, the axis of the cylindrical opening 30, which extends perpendicular to the transverse direction of the yoke plate 25, i.e. to the plane of FIG. 1, lies on an imaginary extension of the longitudinal axis of the insulator string 40, which extension also passes through a cylindrical aperture provided in the yoke plate 25 and forming means for attachment of the insulator string 40 to the yoke plate 25 by the socket clevis bolt 544.

As will be readily apparent from the drawings, a similar arrangement is provided for attachment of each of the other insulator strings to the appropriate yokes, and the openings 29, 229, 230, 329, 330, 429 and 430 are similarly positioned with respect to their respective insulator strings and socket clevis bolts.

While the accompanying drawings show suspension assemblies for bundle conductors comprising three, four and eight sub-conductors or cables, it is to be understood that the present invention is not restricted to these numbers of sub-conductors or cables and that a suspension bracket or apparatus embodying the present invention may be employed to suspend as many as twelve, or even more, cables.

We claim:

1. A suspension apparatus for suspending a bundle of sub-conductors from a support, said suspension apparatus comprising:
    a suspension bracket comprising a yoke plate and defining a support plane;
    at least one pair of insulator assemblies, each having a major axis lying in said support plane, for suspending said suspension bracket at the lower ends of said insulator assemblies from said support;
    said yoke plate having first and second connection portions at opposite sides thereof connected to said insulator assemblies, respectively;
    a plurality of clamp means for securing said sub-conductors to said yoke plate;
    means pivotally connecting said clamp means to said yoke plate;
    at least one of said clamp means being located at the upper side of said yoke plate and between said insulator assemblies; and said yoke plate having attachment means associated with at least one of said insulator assemblies, in alignment with said major axis thereof, for attachment thereto of temporary suspension connector means for suspending said yoke plate upon uncoupling of said one insulator assembly.

2. A suspension apparatus as claimed in claim 1, wherein said attachment means comprise a cylindrical opening extending through said yoke plate in a direction perpendicular to the support plane defined by said yoke plate.

3. A suspension apparatus as claimed in claim 2, wherein the longitudinal axis of said cylindrical opening is located on and extends transversely of an imaginary extension of the longitudinal axis of said one insulator assembly.

4. A suspension apparatus as claimed in claim 1, wherein at least some of said clamp means are disposed in proximity to the lower ends of said insulator assemblies.

5. A suspension apparatus as claimed in claim 4, wherein a pair of said clamp means is disposed in proximity to each of said first and second portions connection, one of each of said pairs being at the upper side of said yoke plate and between said insulator assemblies and the others of said pairs being at the underside of said yoke plate.

6. A suspension bracket for suspending a bundle of cables with said suspension bracket extending in a direction transverse to said cables, said suspension bracket comprising:
    a generally planar body portion;
    said body portion including first and second connection means for connecting insulator strings having a major axis to said body portion for suspending said body portion from said insulator strings generally in the same plane therewith;
    said first and second insulator string connection means being spaced apart from one another in said transverse direction towards opposite sides of said suspension bracket;
    a plurality of cable clamps for securing said cables to said suspension bracket;
    pivot means securing said cable clamps to said body portion for pivotation transversely of said body portion;
    at least one of said cable clamps being located at the upper side of said suspension bracket between said first and second insulator string connection means; and
    said body portion further comprising attachment means for attachment thereto of temporary suspension connector means for connecting said body portion to one of said insulator strings at a position spaced from said body portion, each attachment means being in alignment with one of said insulator string connection means.

7. A suspension bracket as claimed in claim 6, wherein at least some of said cable clamps are located in proximity to said first and second insulator string connection means for reducing the voltage gradient across the lower ends of said insulator strings.

8. A suspension bracket as claimed in claim 6, wherein said attachment means comprise a cylindrical opening in said body portion, said cylindrical opening being perpendicular to said planar body portion.

9. For use in suspending a bundle of sub-conductors from a support, the combination of: a suspension bracket comprising a genrally planar yoke plate; at least one pair of elongated insulator assemblies connected to and suspending said yoke plate at the lower ends of said insulator assemblies, said insulator assemblies lying generally in the plane of said yoke plate; a plurality of clamp means for securing said sub-conductors to said yoke plate; means pivotally connecting said clamp means to said yoke plate; at least one of said clamp means being located at the upper side of said yoke plate and between said insulator assemblies; and attachment means on said yoke plate in direct alignment with at least one of said insulator assemblies for the attachment of temporary suspension connector means for suspending said yoke plate upon uncoupling of said at least one of said insulator assemblies.

10. The combination recited in claim 9, wherein said attachment means are holes; and wherein two insulator assemblies and two holes are provided.

11. A yoke plate for use in suspending a bundle of sub-conductors from a support, said yoke plate being generally planar and comprising first and second connector means for connecting first and second elongated insulator assemblies thereto, so as to lie in the plane thereof; a plurality of clamp means for securing said sub-conductors to said yoke plate; means pivotally connecting said clamp means to said yoke plate; at least one of said clamp means being located at the upper side of said yoke plate and between said connector means; wherein the improvement comprises: attachment means on said yoke plate in direct alignment with at least one of said connector means for attachment of temporary suspension connector means for suspending said yoke plate upon disconnecting of said at least one of said connector means from its respective insulator assembly.

* * * * *